Patented Jan. 25, 1949

UNITED STATES PATENT OFFICE 2,460,071

COBALT CHLORIDE RELATIVE HUMIDITY INDICATORS

Paul Bell Davis, Baltimore, Md., assignor to The Davison Chemical Corporation, Baltimore, Md.

No Drawing. Application February 7, 1945, Serial No. 576,722

8 Claims. (Cl. 252—408)

This invention relates to indicators and more particularly has reference to compositions for indicating the presence and quantity of moisture in a gaseous atmosphere.

An object of this invention is to provide a composition for indicating the presence and quantity of moisture in a gaseous atmosphere within predetermined limits.

Another object of this invention is to provide a composition capable of exhibiting a definite color break when exposed to a gaseous atmosphere having a relative humidity ranging from about 0 to 10%, 10 to 20%, or 40 to 60%.

A further object of this invention is to provide a moisture indicator formed of cobalt chloride associated with an adsorbent carrier such as silica gel.

Still another object of this invention is to provide a moisture indicator formed of an adsorbent material such as silica gel having cobalt chloride incorporated in the pores thereof, in which the adsorbent characteristics of the carrier, its moisture content, the color changing characteristics of the cobalt chloride and its concentration are correlated to produce a definite break or change in color of the indicator when exposed to a gaseous atmosphere having a predetermined relative humidity.

It is also an object of this invention to provide a method of making a color changing moisture indicator.

Other objects of this invention will appear in the following description of the invention.

In accordance with the present invention, it has been found that by treating an adsorbent carrier such as silica gel with a solution of cobalt chloride and drying the so treated carrier, an indicator gel is obtained which has a definite color and which upon exposure to a gaseous atmosphere, such as air having a predetermined relative humidity, will change its color.

It has also been found, in accordance with the present invention, that by correlating the adsorptive characteristics of the carrier, its final moisture content as fixed by the temperatures at which the impregnated carrier is dried, or dried and activated, and the concentration of the cobalt chloride in the carrier, the color of the resulting indicator before exposure to a humid atmosphere and also the color of the indicator after exposure to an atmosphere having a predetermined relative humidity, can be adjusted or controlled.

The present invention is directed principally to moisture indicators formed of a carrier such as silica gel impregnated with varying amounts of cobalt chloride and having definite color changes or breaks when exposed to gaseous atmospheres such as air having predetermined relative humidities.

In preparing an indicator according to the present invention a standard silica gel made by washing an acid reacting hydrogel with an acidic wash water at a temperature of about 150° F., drying and then activating at a temperature of about 850° F. and sized to about 6 to 16 mesh was employed. This silica gel in the activated form was first treated by exposing it to a humid atmosphere having a high relative humidity to saturate the gel with moisture to such an extent that upon contacting it with a liquid it would not disintegrate like it would if freshly activated gel were contacted with a liquid.

After saturation with moisture to an approximate total volatile content of about 30% the gel was impregnated with an aqueous solution of cobalt chloride. It has been found that by first saturating the gel with moisture to the extent indicated, wetting of the gel with the cobalt chloride solution can be effected by using only about 50 ml. of solution per kilogram of gel. Of course, if necessary, more of the solution can be employed. The cobalt chloride solution used was of such concentration that by impregnating about one kilogram of the gel with about 50 ml. of solution (or more if necessary) the gel had a $CoCl_2$ content of the required percentage.

By impregnating silica gel with a quantity of cobalt chloride solution of predetermined concentration, an indicator gel was obtained containing about ½% $CoCl_2$ on the dry basis. This indicator was dried at a temperature of about 300° F. and activated at a temperature of about 400° F. The resulting product had a Munsell color value of about 5.0 PB 4/10. This indicator gel was found to be particularly suitable for the indication of the presence of moisture in a gaseous atmosphere, such as air, when the content of the moisture was such that the atmosphere had a relative humidity ranging between 0 and 10%. For instance, when the indicator gel was exposed to an atmosphere having a relative humidity of about 10%, the color changed to about 7.5 RP 8/2 M. C. V. When this same indicator gel was exposed to an atmosphere having a relative humidity of about 20%, the color still remained at about 7.5 RP 8/2 M. C. V.

By varying the concentration of cobalt chloride in the silica gel and the temperature of drying of the impregnated gel, an indicator having a color change in response to an atmosphere of a different moisture content was produced. For instance, by drying silica gel impregnated with about 2% cobalt chloride at a temperature of about 200° F., an indicator was obtained having a color of about 5.0 PB 3/12 M. C. V. Upon exposing the indicator to an atmosphere having a relative humidity of about 10%, the color changed to about 7.5 PB 5/10 M. C. V. When the same indicator gel was exposed to an atmosphere having a relative humidity of about 20%, the color changed to about 10.0 RP 6/8 M. C. V. This indicator gel was therefore particularly suitable for the indication of the presence of moisture in an atmosphere having a relative humidity of about 10 to 20%.

Another indicator, particularly useful for detecting a relative humidity of about 40 to 60% in a gaseous atmosphere, was prepared with a silica gel having somewhat different characteristics. For this purpose, a silica gel was selected substantially similar to that hereinbefore described but differing therefrom in that it had been activated at a temperature of about 1100° F. instead of 850° F. This silica gel was impregnated with a cobalt chloride solution to incorporate about 5% $CoCl_2$ therein. After drying at about 300° F. and activating at about 400° F., an indicator gel was obtained having a color of about 7.5 PB 2/8 M. C. V. Upon exposing this gel to an atmosphere having a relative humidity of about 40% the color changed to about 10.0 P 4/6 M. C. V. The same gel when exposed to an atmosphere having a relative humidity of about 60%, changed color to about 7.5 RP 5/8, M. C. V.

In the drying and activating of the above-mentioned gels, the impregnated gels were held at the temperatures mentioned for about three hours.

While silica gel has been described as the carrier of the chromatic chemical, a porous glass may be used as described in my copending application, Serial No. 576,726 (now abandoned), filed of even date herewith. Such porous glass is made from a glass containing from 60 to 82% $SiO_2$, 20 to 35% $B_2O_3$ and 5 to 10% alkali oxide heat treated at a temperature of 525 or 600° C. to cause the glass to be separated into two phases, one of which is rich in boric oxide and alkali oxide and is soluble in acids, and the other of which is very rich in silica and substantially insoluble in acids. By treating the so heat treated glass with an acid such as hydrochloride, nitric or sulphuric acids maintained at a temperature at or near the boiling point thereof, the acid reacts with the alkaline phase of the glass forming a number of microscopic pores throughout the body thereof. This porous glass may be used in place of the silica gel hereinbefore mentioned.

The values given for the various colors in the foregoing description refer to the system of color notation devised by A. H. Munsell and published by Munsell Color Company, Inc., Baltimore, Maryland, as the Munsell Book of Color, abridged edition, revised 1942.

From the foregoing description, it will be appreciated that the present invention provides an indicator gel particularly suitable for the indication of the relative humidity of an atmosphere. It will also be appreciated that the present invention provides methods of preparing and utilizing indicator gels having color breaks when exposed to atmospheres of different relative humidities.

I claim:

1. A method of preparing a quantitative relative humidity indicator comprising impregnating activated adsorbent silica gel with ½–5% of cobalt chloride, and heat treating the impregnated gel, said indicator changing color when exposed to an atmosphere having a relative humidity ranging from 0–60%.

2. A quantitative relative humidity indicator adapted to change color when exposed to an atmosphere having a predetermined humidity consisting essentially of silica gel impregnated with cobalt chloride, said indicator having been prepared by the process of claim 1.

3. A method of preparing a quantitative relative humidity indicator comprising impregnating activated silica gel with about ½%, on a dry basis, of cobalt chloride, drying the impregnated silica gel at a temperature of about 300° F., and activating the impregnated silica gel at a temperature of about 400° F., said indicator changing color when exposed to an atmosphere having a relative humidity of 0–10%.

4. A quantitative relative humidity indicator consisting essentially of silica gel impregnated with about ½%, on a dry basis, of cobalt chloride, said indicator changing color when exposed to an atmosphere having a relative humidity ranging from zero to 10% and being prepared by the method of claim 3.

5. A method of preparing a quantitative relative humidity indicator comprising impregnating activated silica gel with about 2%, on a dry basis, of cobalt chloride, and drying the impregnated silica gel at a temperature of about 200° F., said indicator changing color when exposed to an atmosphere having a relative humidity of 10–20%.

6. A quantitative relative humidity indicator consisting essentially of silica gel impregnated with about 2%, on a dry basis, of cobalt chloride, said indicator changing color when exposed to an atmosphere having a relative humidity ranging from 10 to 20% and being prepared by the method of claim 5.

7. A method of preparing a quantitative relative humidity indicator comprising impregnating activated silica gel with about 5%, on a dry basis, of cobalt chloride, drying the impregnated silica gel at a temperature of about 300° F., and activating the impregnated silica gel at a temperature of about 500° F., said indicator changing color when exposed to an atmosphere having a relative humidity of 40–60%.

8. A quantitative relative humidity indicator consisting essentially of silica gel impregnated with about 5%, on a dry basis, of cobalt chloride, said indicator changing color when exposed to an atmosphere having a relative humidity ranging from 40 to 60% and being prepared by the method of claim 7.

PAUL BELL DAVIS.

REFERENCES CITED

The following references are of record in the file of this patent:

UNITED STATES PATENTS

| Number | Name | Date |
|---|---|---|
| 1,947,381 | Connolly et al. | Feb. 13, 1934 |
| 1,976,875 | Connolly et al. | Oct. 16, 1934 |
| 2,214,354 | Snelling | Sept. 10, 1940 |

FOREIGN PATENTS

| Number | Country | Date |
|---|---|---|
| 280,934 | Great Britain | Feb. 18, 1929 |
| 345,672 | Great Britain | Mar. 23, 1931 |
| 393,094 | Great Britain | June 1, 1933 |

Certificate of Correction

Patent No. 2,460,071. January 25, 1949.

PAUL BELL DAVIS

It is hereby certified that error appears in the printed specification of the above numbered patent requiring correction as follows:

Column 3, line 70, claim 1, after "gel" insert *at 200 to 400° F.*;

and that the said Letters Patent should be read with this correction therein that the same may conform to the record of the case in the Patent Office.

Signed and sealed this 7th day of June, A. D. 1949.

[SEAL]

THOMAS F. MURPHY,
*Assistant Commissioner of Patents.*